United States Patent Office 3,411,918
Patented Nov. 19, 1968

3,411,918
COLOR RESTORATION OF DISTILLED LIQUORS
Gordon B. Nickol, Cincinnati, Ohio, assignor to National Distillers and Chemical Corporation, New York, N.Y., a corporation of Virginia
No Drawing. Filed Apr. 7, 1964, Ser. No. 358,075
14 Claims. (Cl. 99—34)

ABSTRACT OF THE DISCLOSURE

Preventing the discoloration of and restoring the color to liquors by adding thereto minor amounts of an alkali metal ethylenediamine tetraacetate.

---

This invention pertains to a novel method for the restoration of color to aged, distilled liquors. More particularly, the invention relates to the restoration of the natural color to whiskey which has been discolored during processing or packaging. The invention also relates to a method whereby the discolorization of whiskey can be prevented.

Producers of aged, distilled alcoholic beverages such as whiskey have been troubled from time to time with serious discoloration problems. In some instances the aged, distilled liquor has lost much of its natural color and, in fact, has often turned black. Any noticeable departure from the natural color of the alcoholic beverages results in a product which is unmarketable. In the past the industry has overcome this problem by treating the aged, distilled liquors, which have become discolorized, with skimmed milk or skimmed mik powder. However, this prior art method has been found to have certain serious disadvantages. One problem results from the tendency to overtreat and to obtain an aged, distilled alcoholic liquor which lacks its ordinary natural color. In addition, such prior art treating agents effect color improvement by forming a precipitate with the contaminants. The resulting precipitate must then be subsequently removed by separate sedimentation or filtration steps, which can be difficult to accomplish as well as time consuming. This disadvantage is also present when utilizing other precipitating agents which have been proposed in this art to stabilize or clarify aged, distilled alcoholic liquors.

One object of the present invention is to provide a novel method for restoring the natural color of aged, distilled alcoholic liquors which avoids the disadvantages encountered in the prior art methods.

Another object of the present invention is to provide a novel method for treating aged whiskey, which has become discolorized, to restore its natural color.

A further object of the present invention is to provide a novel color restorative method for treating aged whiskey which does not result in the precipitation of impurities and require a separation step for removal of the precipitate.

A still further object of this invention is to provide a novel method which effectively prevents discoloration of aged, distilled alcoholic liquors.

These and other objects of the present invention will become readily apparent from the ensuing description and the illustrative embodiments.

In accordance with the present invention it has been found that one of the major causes for the discoloration of aged, distilled alcoholic liquors is the presence of such metal contaminants as iron or copper. It has been further found that even relatively minute amounts of these metals, present as ferric and cupric ions, in the distilled alcoholic liquor have a deleterious effect on the natural color of the alcoholic liquor. Thus, for example, the presence of only 1 p.p.m. of dissolved iron will turn whiskey black. Metallic copper impurities, on the other hand, tend to turn aged, distilled alcoholic liquors green. The exact source of the contamination is difficult to determine, although in a few cases the contamination has been traced to the contact of the distilled liquor with metal in the aging barrels. It is also possible that metallic impurities in the treating tanks are responsible for the contamination or that dilution water added to the whiskey contains the undesirable metals.

In general, the present invention resides in the discovery that the discoloration of aged, distilled alcoholic liquors can be overcome or prevented by incorporating therein minor amounts of an alkali metal ethylenediamine tetraacetate. When dealing with alcoholic liquors which have lost their natural colors, it has been found that the alkali metal ethylenediamine tetraacetate will effectively restore the natural color. Since this treatment does no result in the formation of a precipitate, there is no need to employ a filtration or other separation technique. Moreover, in addition to restoring the natural color of the aged, distilled alcoholic liquors, the use of the aikali metal ethylenediamine tetraacetate has the further advantage of not altering the flavor of the treated liquors. The alkali metal ethylenediamine tetraacetate appears to form chelates with the metal contaminants thereby dissociating or preventing the formation of colored complexes which would ordinarily take place between the metals and certain constituents present in the aged, distilled alcoholic liquors. In accordance with one feature of this invention, it has been also found that the resulting colorless metal-alkali metal ethylenediamine tetraacetate chelates are soluble in the aged, distilled alcoholic liquors, e.g. whiskey, and are further characterized by an unusually high order of stability under normal conditions. The fact that the undesirable colored metal complexes are soluble in the aged, distilled alcoholic liquors and dissociate sufficiently so that chelation of the metals with disodium ethylenediamine tetraacetate can readily be accomplished is an important aspect of the present invention. Admittedly, the use of metallic salts of ethylenediamine tetraacetic acid has been previously proposed in wine, vinegar and fruit juices in order to prevent the formation of precipitates and to inhibit haze formation or darkening by trace metal catalysts. In those situations, however, the ethylenediamine tetraacetic acid salt can be employed only as a preventative measure, since once the precipitation or discoloration has occurred the process is irreversible. Nevertheless, it will be understood that the use of alkali metal ethylenediamine tetraacetate as a discoloration preventative additive to aged, distilled alcoholic liquors is also contemplated as being within the broad concept of the present invention. It is possible, therefore, to add the minute amounts of the alkalki metal ethylenediamine tetraacetate to aged, distilled alcoholic liquors which are believed to be contaminated with iron or copper impurities in order to avoid future discoloration problems.

As previously discussed, only relatively minor amounts of the alkali metal ethylenediamine tetraacetate need be added to the aged, distilled alcoholic liquor in order to eliminate discoloration or to prevent discoloration from occurring. The amount of additive will generally range from about 2 to 20 p.p.m. of the alkali metal ethylenediamine tetraacetate per 1 p.p.m. of metal contaminant, and preferably about 5 to 10 p.p.m. of the alkali metal ethylenediamine tetraacetate per 1 p.p.m. of metal contaminant. It follows that amount of alkali metal ethylenediamine tetraacetate added may vary over a wide range depending upon the concentration of the metal contaminant. Conventional methods of analysis may be employed, if necessary, to determine the concentration of the contaminant. In most cases, however, the contamination will only be a few p.p.m. of metal, and color restoration can be readily accomplished by utilizing minor amounts of the alkali metal ethylenediamine tetraacetate. It has also been found advantageous to employ the alkali metal ethylenediamine tetraacetate in the form of a water solution. The use of distilled water is preferred for such purposes. The concentration of the alkali metal ethylenediamine tetraacetate in the water solution will range from about 1 to 10% by weight, and preferably from about 4 to 6% by weight. When employed in solution, the alkali metal ethylenediamine tetraacetate will be in its hydrated form.

Although all of the alkali metal salts of the ethylenediamine tetraacetic acid such as the sodium, potassium, and lithium salts may be effectively employed in carrying out the color restorative method of this invention, the preferred treating agents are the polysodium salts. The use of disodium ethylenediamine tetraacetate is especially preferred, and the invention will be hereinafter described and illustrated in conjunction with the use of the disodium salt. It was further found that other commercially available salts of the ethylenediamine tetraacetic acid such as the calcium salts are undesirable, since their use results in the formation of an insoluble precipitate in the aged, distilled alcoholic liquor being treated.

The aged carbon distilled alcoholic liquors which may be treated in accordance with the method of this invention includes all of the distilled, high alcohol content liquors of the whiskey and other types such as bourbon, rye, wheat rum, brandy, Scotch, etc., which have been aged in wooden barrels or other containers as is commonly practiced in the distilling industry.

As discussed above, the preferred method of the present invention comprises the addition of the disodium ethylenediamine tetraacetate to the aged, distilled alcoholic liquor after discoloration has taken place. Not only is color restoration accomplished, but the usual taste tests indicate that the flavor has not been deleteriously affected.

The invention will now be more fully understood by reference to the following illustrative embodiment.

EXAMPLE

A sample of 86 proof Kentucky bourbon whiskey, containing 0.05 p.p.m. iron, was pale amber in color and exhibited a light transmission value of 50.5 at 530 millimicrons wave length. In order to study the effects of iron contamination, iron in the form of iron powder was gradually added and dissolved in the whiskey until a total of 6 p.p.m. of iron were present. The addition of the first p.p.m. of iron discolored the whiskey to a deep black. Successive increments of disodium ethylenediamine tetraacetate, as a 5% by weight solution in distilled water, were added with stirring. Light transmission was determined on the whiskey after each addition of the disodium ethylene diamine tetraacetate. The results are tabulated below:

| Sample | Disodium Salt of EDTA, p.p.m. | Percent Light Transmission at 530 m$\mu$ | Iron, p.p.m. |
| --- | --- | --- | --- |
| Untreated | 0.0 | 50.5 | 0.05 |
| Untreated—Fe | 0.0 | 9.4 | 6.0 |
| Treated | 15 | 14.5 | 6.0 |
| Do | 30 | 25.0 | 6.0 |
| Do | 40 | 35.0 | 6.0 |
| Do | 50 | 50.2 | 6.0 |

A controlled taste test comparison of the whiskey sample treated with 50 p.p.m. of disodium ethylenediamine tetraacetate versus the untreated whiskey sample, prior to the addition of the iron powder, indicated no significant difference in taste.

The above data show that the natural color of whiskey can be restored after discoloration resulting from the presence of metallic impurities by treatment with minute amounts of disodium ethylenediamine tetraacetate. Moreover, the foregoing taste test comparison reveals that there was no change in flavor as a result of the color restorative treatment. The absence of precipitates resulting from the chelation of the metallic impurities with the disodium salt of the ethylene diamine tetraacetic acid was noted with respect to the above tests. As previously discussed, this aspect of the present invention is an important advantage over the methods heretofore proposed in this field.

Although all of the theoretical factors involved in the present color restorative method are not fully understood, it is believed that the normal color of whiskey results from the lignins introduced during the aging process. The undesirable color is believed to be caused by a tightly-bound complex of iron or copper and the tannins. These tannins as well as other color-forming substances are found in the whiskey only after it has been aged in charred barrels such as those made from oak wood. This has been demonstrated by the fact that the addition of iron powder to colorless, distilled, unaged whiskey did not result in color formation. Consequently, it appears that the use of the disodium ethylene-diamine tetraacetate, for example, splits the colored iron or copper-tannin complex to form a colorless, soluble metal-disodium ethylenediamine tetraacetate complex without affecting the lignins.

While particular embodiments of this invention have been shown above, it will be understood that the invention is obviously subject to variations and modifications without departing from its broader aspects. For example, the exact amount of alkali metal ethylenediamine tetraacetate to be employed may be determined empirically by simple spot determinations utilizing varying amounts of the additive.

What is claimed is:

1. A method for restoring the natural color to a discolorized, aged, distilled alcoholic liquor which comprises adding to said discolorized liquor a sufficient amount of an alkali metal ethylenediamine tetraacetate to effect natural color restoration.

2. The method of claim 1 wherein said aged, alcoholic liquor is whiskey.

3. The method of claim 1 wherein said alkali metal ethylenediamine tetraacetate is sodium ethylenediamine tetraacetate.

4. The method of claim 1 wherein said alkali metal ethylenediamine tetraacetate is disodium ethylenediamine tetraacetate.

5. A method for restoring the natural color to an aged, distilled alcoholic liquor, which has been discolorized by a metal contaminant selected from the group consisting of iron, copper and mixtures thereof, which comprises adding to said discolorized, aged alcoholic liquor a sufficient amount of an alkali metal ethylenediamine tetraacetate to effect natural color restoration.

6. The method of claim 5 wherein said alcoholic liquor is whiskey.

7. The method of claim 5 wherein said alkali metal ethylenediamine tetraacetate is sodium ethylenediamine tetraacetate.

8. The method of claim 5 wherein said alkali metal ethylenediamine tetraacetate is disodium ethylenediamine tetraacetate.

9. The method of claim 5 wherein the amount of the alkali metal ethylenediamine tetraacetate is within the range of about 5 to 10 p.p.m. per 1 p.p.m. of metal contaminant.

10. A method for restoring the natural color to an aged, distilled whiskey, which has been discolorized by a metal contaminant selected from the group consisting of iron, copper and mixtures thereof, which comprises adding to said discolorized, aged whiskey sodium ethylenediamine tetraacetate in an amount within the range of about 2 to 20 p.p.m. per 1 p.p.m. of metal contaminant.

11. The method of claim 10 wherein said metal contaminant is iron.

12. The method of claim 10 wherein said sodium ethylenediamine tetraacetate is disodium ethylenediamine tetraacetate.

13. The method of claim 10 wherein the amount of sodium ethylenediamine tetraacetate is within the range of about 5 to 10 p.p.m. per 1 p.p.m. of metal contaminant.

14. The method of claim 10 wherein said aged whiskey is bourbon.

References Cited

UNITED STATES PATENTS

| | | | |
|---|---|---|---|
| 2,748,002 | 5/1956 | Kneen | 99—48 |
| 2,847,308 | 8/1958 | Bersworth et al. | 99—48 |

LIONEL M. SHAPIRO, *Primary Examiner.*

D. M. NAFF, *Assistant Examiner.*